United States Patent
Zhang et al.

(10) Patent No.: US 10,657,347 B2
(45) Date of Patent: May 19, 2020

(54) METHOD FOR CAPTURING FINGERPRINT AND ASSOCIATED PRODUCTS

(71) Applicant: GUANGDONG OPPO MOBILE TELECOMMUNICATIONS CORP., LTD., Dongguan, Guangdong (CN)

(72) Inventors: Haiping Zhang, Guangdong (CN); Le Yang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 187 days.

(21) Appl. No.: 15/934,212

(22) Filed: Mar. 23, 2018

(65) Prior Publication Data

US 2018/0336392 A1     Nov. 22, 2018

(30) Foreign Application Priority Data

May 22, 2017   (CN) .......................... 2017 1 0365938

(51) Int. Cl.
```
G06K 9/00       (2006.01)
G06Q 20/40      (2012.01)
G06F 21/32      (2013.01)
G06F 3/0488     (2013.01)
```
(52) U.S. Cl.
CPC ..... G06K 9/00013 (2013.01); G06F 3/04886 (2013.01); G06F 21/32 (2013.01); G06K 9/0004 (2013.01); G06Q 20/40145 (2013.01); G06K 2009/0006 (2013.01)

(58) Field of Classification Search
None
See application file for complete search history.

(56) References Cited

U.S. PATENT DOCUMENTS

| | | | |
|---|---|---|---|
| 2004/0184027 A1 | 9/2004 | Mizutani et al. | |
| 2008/0225241 A1* | 9/2008 | Chen | G03B 21/2053 353/85 |
| 2016/0042166 A1* | 2/2016 | Kang | G06F 21/32 726/7 |
| 2016/0253538 A1 | 9/2016 | Lu et al. | |
| 2017/0168619 A1* | 6/2017 | Yang | G06F 3/0412 |

(Continued)

FOREIGN PATENT DOCUMENTS

| | | |
|---|---|---|
| CN | 1527243 A | 9/2004 |
| CN | 102682280 A | 9/2012 |
| CN | 202632317 U | 12/2012 |

(Continued)

OTHER PUBLICATIONS

Chinese Patent Application No. 201710365938.7, Office Action dated May 22, 2019, 6 pages.

(Continued)

*Primary Examiner* — Vikkram Bali
(74) *Attorney, Agent, or Firm* — Lathrop GPM LLP

(57) ABSTRACT

Embodiments of the present disclosure provide a method for capturing a fingerprint and associated products. The method includes determining a first luminance based on a currently running application and controlling light-emitting units for a first area to emit light with the first luminance. The method further includes capturing the fingerprint when the light with the first luminance illuminates the first area.

17 Claims, 4 Drawing Sheets

(56) References Cited

U.S. PATENT DOCUMENTS

2019/0303640 A1* 10/2019 Song .................... G06K 9/0004

FOREIGN PATENT DOCUMENTS

| CN | 104537365 A | 4/2015 |
| CN | 105955810 A | 9/2016 |
| CN | 107292235 A | 10/2017 |
| CN | 107886038 A | 4/2018 |
| CN | WO 2018196390 A1 | 11/2018 |
| KR | 20150003501 A | 1/2015 |
| TW | 200426699 A | 12/2004 |
| WO | WO 0145283 A1 | 6/2001 |
| WO | WO 2015005959 A1 | 1/2015 |

OTHER PUBLICATIONS

Chinese Patent Application No. 201710365938.7, English translation of Office Action dated May 22, 2019, 8 pages.
PCT/CN2018/077053 English translation of the International Search Report and Written Opinion dated Apr. 23, 2018, 11 pages.
European Patent Application No. 18159057.1, Extended Search and Opinion dated Jul. 18, 2018, 10 pages.
Holz C., et al. "Fiberio," Proceedings of the 26th Annual ACM Symposium on User Interface Software and Technology, UIST'13, published on Oct. 8, 2013, pp. 41-50; cited in European Patent Application No. 18159057.1, Extended Search and Opinion.
Taiwan Patent Application No. 107107142, Office Action dated Jan. 9, 2019 with English translation, 10 pages.
Singapore Patent Application No. 11201905559U, Office Action dated Mar. 28, 2020, 10 pages.

* cited by examiner

METHOD FOR CAPTURING FINGERPRINT AND ASSOCIATED PRODUCTS

FIELD

The present disclosure relates to a field of electronic technologies, and more particularly to a method for capturing a fingerprint and associated products.

BACKGROUND

Fingerprint recognition has become a standard configuration for smart phones. A fingerprint sensor is a key component for capturing a fingerprint. The fingerprint sensors may include optical fingerprint sensors, capacitance sensors, ultrasonic sensors and the like.

Sharpness of a fingerprint captured by the optical fingerprint sensor relates to luminance of light. The bigger the luminance is, the higher the sharpness is, and vice versa. At present, the light comes from a screen of the phone. However, the luminance of the screen is usually unchangeable.

SUMMARY

A terminal device includes an application processor, an optical fingerprint sensor and a touch screen. The touch screen includes a first area. The optical fingerprint sensor is arranged under the first area. The application processor is configured to determine a first luminance based on a currently running application and to control light-emitting units for the first area to emit light with the first luminance. The optical fingerprint sensor is configured to capture the fingerprint when the light with the first luminance illuminates the first area.

A method is applicable to a terminal device including an application processor, an optical fingerprint sensor and a touch screen. The touch screen includes a first area. The optical fingerprint sensor is arranged under the first area. The method includes determining a first luminance based on a currently running application, and controlling light-emitting units for the first area to emit light with the first luminance; and capturing the fingerprint when the light with the first luminance illuminates the first area.

A computer readable storage medium is configured to store computer programs for exchanging electrical data. The computer programs cause a terminal device to execute parts of or all of the method described in the second aspect.

These or other aspects of the present disclosure will be more readily understandable in following descriptions of embodiments.

BRIEF DESCRIPTION OF THE DRAWINGS

In order to illustrate technical solutions in embodiments of the present disclosure and related arts more clearly, accompanying drawings required in embodiments of the present disclosure and related arts will be described.

DETAILED DESCRIPTION

Figure 1:
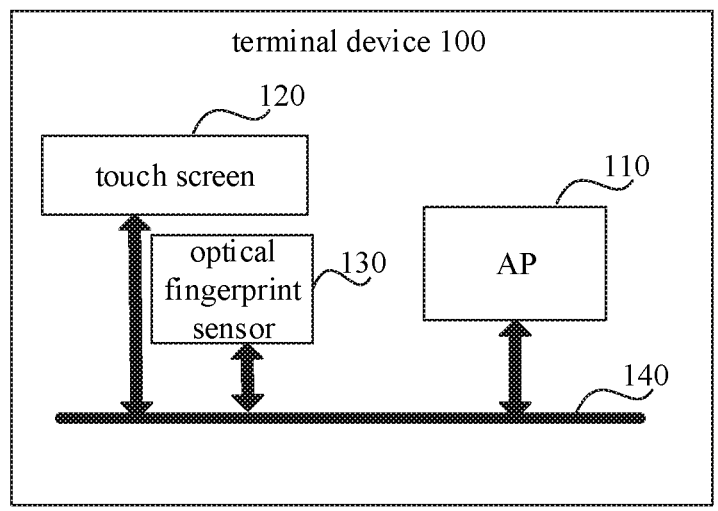
FIG. 1 is a schematic diagram illustrating a terminal device provided in embodiments of the present disclosure.

In order to make those skilled in the art to better understand solutions of the present disclosure, the technical solutions in embodiments of the present disclosure will be clearly and completely described with reference to the accompanying drawings in the embodiments of the present disclosure. Apparently, embodiments described herein are merely some embodiments of the present disclosure, rather than all embodiments. All other embodiments obtained by those skilled in the art based on the embodiments of the present disclosure without inventive labors shall fall within a protection scope of the present disclosure.

Now, the embodiments of the present disclosure will be described in detail.

The present disclosure relates to a terminal device. The terminal device includes an application processor, an optical fingerprint sensor and a touch screen. The touch screen includes a first area. The optical fingerprint sensor is arranged under the first area. The application processor is configured to determine a first luminance based on a currently running application and to control light-emitting units for the first area to emit light with the first luminance. The optical fingerprint sensor is configured to capture the fingerprint when the light with the first luminance illuminates the first area.

The present disclosure relates to a method for capturing a fingerprint. The method is applicable to a terminal device. The terminal device includes an application processor, an optical fingerprint sensor and a touch screen. The touch screen includes a first area. The optical fingerprint sensor is arranged under the first area. The method includes: determining a first luminance based on a currently running application; controlling light-emitting units for the first area to emit light with the first luminance; and capturing the fingerprint when the light with the first luminance illuminates the first area.

The present disclosure relates to a device for capturing a fingerprint. The device for capturing a fingerprint is applicable to a terminal device. The terminal device includes an application processor, an optical fingerprint sensor and a touch screen. The touch screen includes a first area. The optical fingerprint sensor is arranged under the first area. The device for capturing a fingerprint includes a processing module and a capturing module. The processing module is configured to determine a first luminance based on a currently running application and to control light-emitting units for the first area to emit light with the first luminance. The capturing module is configured to capture the fingerprint when the light with the first luminance illuminates the first area.

The present disclosure relates to another terminal device. The terminal device includes an application processor, an optical fingerprint sensor, a touch screen, a memory and one or more programs. The one or more programs are stored in the memory and executed by the application processor. The one or more programs include instructions for executing the above method.

The present disclosure relates to a non-transitory computer readable storage medium, storing computer programs for exchanging electrical data. The computer programs cause a terminal device to execute the above method. The terminal device includes an application processor, an optical fingerprint sensor and a touch screen. The touch screen includes a first area. The optical fingerprint sensor is arranged under the first area.

In the specification, the claims and the drawings of the present disclosure, terms such as "first", "second", "third", and "fourth" are used to distinguish different objects, rather than to describe a specific sequence. Moreover, terms such as "include" and "comprise" and any variations thereof are intended to cover a non-exclusive inclusion. For example, a process, method, system, product, or device including a series of actions or units is not limited to the actions or units listed but may alternatively further include actions or units not listed or may alternatively further include other actions or units inherent to the process, method, product or device.

Reference herein to "embodiment" means that a particular feature, structure, or characteristic described in connection with embodiments may be included in at least one embodiment of the present disclosure. The appearances of the phrase in various places in the specification do not necessarily refer to the same embodiment, nor are separate or optional embodiments mutually exclusive of other embodiments. As can be understood by those skilled in the art explicitly and implicitly, the embodiments described herein may be combined with other embodiments.

A terminal device, also referred to as user equipment (UE), is a device for providing voice and/or data connectivity to a user. For example, the terminal device is a handheld device having a wireless connection function, an on-board device having a wireless connection function, or the like. Commonly-used terminals include, for example, a mobile phone, a tablet computer, a laptop computer, a palmtop computer, a mobile internet device (MID), a wearable device (such as a smart watch, a smart bracelet, a pedometer), and the like.

Embodiments of the present disclosure will be described with reference to drawings of embodiments of the present disclosure.

FIG. 1 is a schematic diagram illustrating a terminal device 100 provided in embodiments of the present disclosure. The terminal device 100 includes an application processor (AP) 100, an optical fingerprint sensor 130 and a touch screen 120. The touch screen 120 includes a first area. The optical fingerprint sensor 130 is arranged under the first area.

The AP 100 is configured to determine a first luminance based on a currently running application and to control light-emitting units for the first area to emit light with the first luminance.

The optical fingerprint sensor 130 is configured to capture the fingerprint when the light with the first luminance illuminates the first area.

In an example, the touch screen 120 is one of a LCD (liquid crystal display), an OLED (organic light-emitting diode) screen and a LED (light-emitting diode) screen.

In an example, the AP 110 is configured to determine the first luminance based on the currently running application when a fingerprint capturing instruction sent by the currently running application is detected and to control the light-emitting units for the first area to emit the light with the first luminance. The currently running application may be a fingerprint unlocking application, a fingerprint payment application, a fingerprint recording application or the like.

In an example, a maximum size of the first area may equal to a size of the touch screen. A minimum size of the first area may be set to allow the user to input the finger with a sufficient area. The size of the first area is not limited in the present disclosure.

In an example, the first area may be arranged at a bottom left corner of the touch screen or a bottom right corner of the touch screen, or a top right corner of the touch screen, which is not limited in the present disclosure.

In an example, a shape of the first area may be circular, square, oval, rhombus or the like, which is not limited in the present disclosure.

In an example, there are one or more first areas, which is not limited in the present disclosure.

Each application corresponds to one first luminance. A correspondence between applications and first luminances is illustrated as Table 1. As illustrated in Table 1, different applications may correspond to the same first luminance or different first luminances.

In addition, the first luminance corresponding to each application may be customized by the user. Alternatively, the first luminance corresponding to each application may be determined by the AP 110 based on an application characteristic. For example, when the currently running application is the fingerprint unlocking application whose application characteristic is unlocking, the first luminance is luminance 1. Also, for example, when the currently running application is the fingerprint recording application whose application characteristic is recording, the first luminance is luminance 2. In addition, for example, when the currently running application is the fingerprint payment application whose application characteristic is payment including a high-amount payment and a low-amount payment, the first luminance is luminance 4 when the characteristic is the high-mount payment while the first luminance is luminance 3 when the characteristic is the low-amount payment.

TABLE 1

| Application | First luminance |
|---|---|
| application 1 | luminance 1 |
| application 2 | luminance 2 |
| application 3 | luminance 2 |
| . | . |
| . | . |
| . | . |
| application n | luminance n |

For example, as illustrated in Table 1, when the currently running application is the application 1, the first luminance corresponding to the application 1 is the luminance 1. The AP 110 controls the light-emitting units for the first area to emit the light with the luminance 1.

Therefore, the present disclosure may flexibly adjust the luminance of the light for capturing the fingerprint based on the currently running application, thereby improving the performance of the terminal device. In addition, when the fingerprint is captured, only the first area is controlled to emit the light, which may reduce power consumption of the terminal device.

In an example, each application corresponds to one security level. Each security level corresponds to one first luminance. When the security level of an application i is higher than the security level of an application j, the first luminance corresponding to the application i is higher than the first luminance corresponding to the application j.

In detail, a correspondence among applications, security levels and first luminances is illustrated as Table. 2. As illustrated in Table 2, the security levels corresponding to different applications may be the same with each other, or may be different from each other, but the first luminances corresponding to different security levels are different.

Since the higher the luminance, the higher the sharpness of the fingerprint captured by the optical fingerprint sensor 130, when the security level of an application is high, it requires high sharpness of the fingerprint, vice versa. Therefore, in embodiments of the present disclosure, the security level relates to the first luminance to reasonably control the luminance of the first area, thereby further improving the performance of the terminal device.

TABLE 2

| Application | Security Level | First Luminance |
|---|---|---|
| application 1 | security level 1 | luminance 1 |
| application 2 | security level 2 | luminance 2 |
| application 3 | security level 2 | luminance 2 |
| . | . | . |
| . | . | . |
| . | . | . |
| application n | security level n | luminance n |

Further, the security levels corresponding to the applications may be customized by the user. Alternatively, the security levels corresponding to the applications may be customized by the AP 110. Alternatively, the security levels corresponding to the applications may be determined by the AP 110 based on the application characteristics. For example, when the currently running application is the fingerprint unlocking application whose application characteristic is unlocking, since the security level required by the unlocking is relatively low, the security level corresponding to the fingerprint unlocking application may be set as security level 1. Also, for example, when the currently running application is the fingerprint recording application whose application characteristic is recording, since a success rate of verifying the fingerprint depends on the sharpness of the fingerprint recorded by the fingerprint recording application, it thus requires a relatively high security level, and the security level corresponding to the fingerprint recording application may be set as security level 2. In addition, for example, when the currently running application is the fingerprint payment application whose application characteristic is payment including high-amount payment and low-amount payment, since related to pecuniary exchange, it thus requires a higher security level, the security level corresponding to the fingerprint payment application may be set as security level 4 when the application characteristic is the high-amount payment while the security level corresponding to the fingerprint payment application may be set as security level 3 when the application characteristic is the low-amount payment. The security level 1<the security level 2<the security level 3, and so on.

Further, the first luminances corresponding to the security levels may be customized by the user. Alternatively, the first luminances corresponding to the security levels may be customized by the AP 110.

For example, as illustrated in Table 2, when the currently running application is the application 1, the security level corresponding to the application 1 is the security level 1, and the first luminance corresponding to the security level 1 is the luminance 1. The AP 110 may control the light-emitting units for the first area to emit the light with the luminance 1.

In an example, when the currently running application is the fingerprint payment application, a currently displayed interface on the touch screen 120 is a payment interface. The touch screen also includes a second area. The first area and the second area are mutually exclusive with each other. The AP 110 is further configured to disable light-emitting units for the second area when controlling the light-emitting units for the first area to emit the light with the first luminance.

The AP 110 is further configured to control the light-emitting units for the second area and the light-emitting units for the first area to emit light with a third luminance when the payment is completed. The third luminance is a display luminance set currently on the terminal device.

A fingerprint payment process (including a fingerprint capturing process and a fingerprint comparison process) takes a certain period of time. In order to reduce the power consumption of the terminal device 100, the AP 110 may control the second area to not emit the light during the fingerprint payment process, and control the first area and the second area to emit the light with a normal luminance after the fingerprint payment process completes.

In an example, when the currently running application is the fingerprint payment application, a currently displayed interface on the touch screen 120 is a payment interface. The touch screen also includes a second area. The first area and the second area are mutually exclusive with each other. The AP 110 is further configured to control light-emitting units for the second area to emit light with a second luminance when controlling the light-emitting units for the first area to emit the light with the first luminance. The second luminance is lower than the first luminance.

If the second luminance is the display luminance set currently on the terminal device, during the fingerprint capturing process, the AP 110 only controls the luminance of the first area to rise. Therefore it may not only capture the fingerprint with high sharpness by the optical fingerprint sensor 130, but also reduce the power consumption of the terminal device 100. Also, if the first luminance is the display luminance set currently on the terminal device, during the fingerprint capturing process, the AP 110 controls the luminance of the second area to fall down. Therefore it may not only capture the fingerprint with high sharpness by the optical fingerprint sensor 130 and reduce the power consumption of the terminal device 100, but also make the user to see clearly content displayed in the second area.

Figure 2:
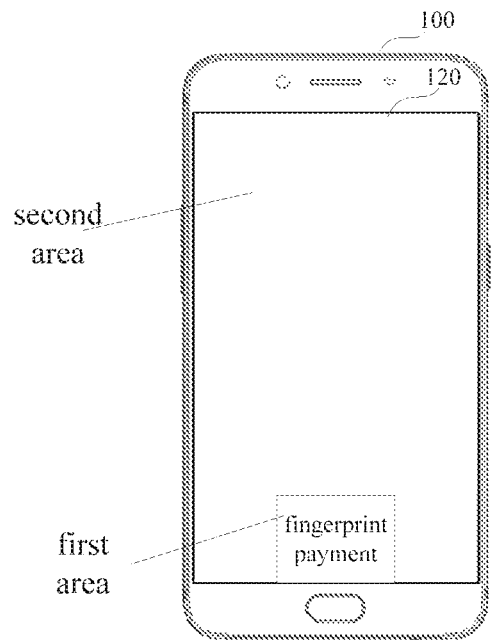
FIG. 2 is a schematic diagram illustrating an interface provided in embodiments of the present disclosure.

Further, the second area is remaining of the touch screen 120 except the first area, as illustrated in FIG. 2.

Further, the first area is configured to display prompt information for prompting the user to input the fingerprint. The prompt information may be illustrated in FIG. 2 as "fingerprint payment", or may be "input fingerprint" and the like, which is not limited in embodiments.

Figure 3:
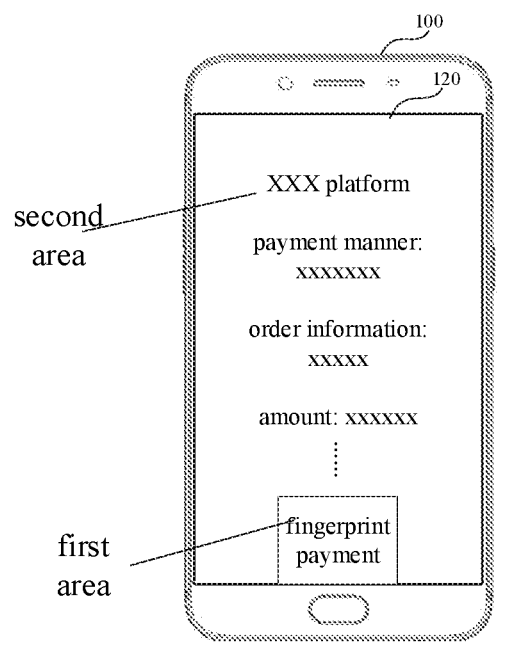
FIG. 3 is a schematic diagram illustrating another interface provided in embodiments of the present disclosure.

Further, the second area is configured to display information related to a current operation, which may be illustrated in FIG. 3 as "XXX platform, payment manner: xxxxxxx, order information: xxxxx, amount: xxxxx".

In an example, the first area includes N subareas, where N is an integer greater than 1. The AP 110 is further configured to control light-emitting units for M subareas included in the N subareas to emit the light with the first luminance, where M is a positive integer, and a horizontal project of the finger of the user is located in the M subareas.

Further, the AP 110 is further configured to disable light-emitting units for other subareas included in the N subareas than the M subareas when controlling the light-emitting units for the M subareas included in the N subareas to emit the light with the first luminance.

Alternatively, the AP 110 is further configured to control light-emitting units for other subareas included in the N subareas than the M subareas to emit light with a fourth luminance, when controlling the light-emitting units for the M subareas included in the N subareas to emit the light with the first luminance. The fourth luminance is lower than the first luminance.

Further, sizes of the N subareas are the same. Alternatively, sizes of at least two of the N subareas are different from each other.

Further, shapes of the N subareas are the same. Alternatively, shapes of at least two of the N subareas are different from each other.

Figure 4:
FIG. 4 is a schematic diagram illustrating a first area provided in embodiments of the present disclosure.

For example, FIG. 4 is a schematic diagram illustrating an interface provided in embodiments of the present disclosure. As illustrated in FIG. 4, the sizes of the N subareas included in the first area are the same and the shapes of the N subareas included in the first area are the same. The first area includes a subarea A, . . . , a subarea L. If the horizontal project of the finger of the user is within the subarea B, the subarea C, the subarea F and the subarea the currently running application only needs to control light-emitting units for the subarea B, the subarea C, the subarea F and the subarea G to emit the light with the first luminance to enable the optical fingerprint sensor to capture the fingerprint with high sharpness. For other subareas (remaining subareas included in the first area except the subarea B, the subarea C, the subarea F and the subarea G), the light-emitting units for these subareas may be disabled or the luminance of these subareas may be decreased, thereby reducing the power consumption of the terminal device with an acquirement of the fingerprint with the high sharpness.

Figure 5:
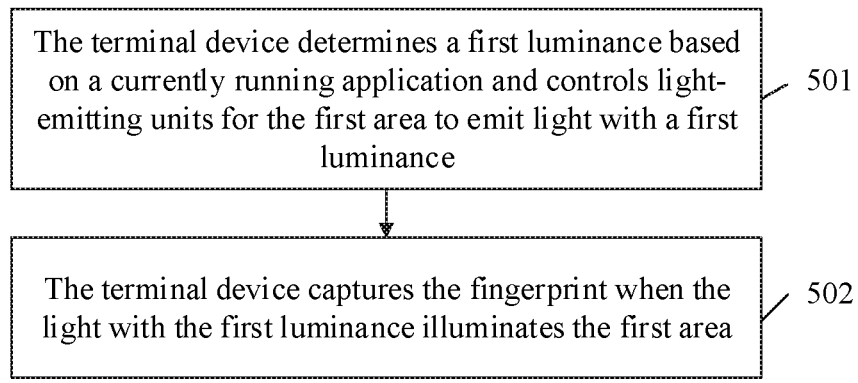
FIG. 5 is a flow chart illustrating a method for capturing a fingerprint provided in embodiments of the present disclosure.

FIG. 5 is a flow chart illustrating a method for capturing a fingerprint provided in embodiments of the present disclosure. The method is applicable to a terminal device. The terminal device includes an AP, an optical fingerprint sensor and a touch screen. The touch screen includes a first area. The optical fingerprint sensor is arranged under the first area. The method includes the following.

In block 501, a first luminance is determined by the terminal device based on a currently running application and light-emitting units for the first area is controlled by the terminal device to emit light with a first luminance. The light with the first luminance is configured to illuminate a finger of a user.

In block 502, the fingerprint is captured by the terminal device when the light with the first luminance illuminates the first area.

In an example, the touch screen is one of a LCD, an OLED screen and a LED display screen.

In an example, the first luminance is determined by the terminal device based on the currently running application when a fingerprint capturing instruction sent by the currently running application is detected. The light-emitting units for the first area are controlled by the terminal device to emit the light with the first luminance. The currently running application may be a fingerprint unlocking application, a fingerprint payment application, a fingerprint recording application or the like.

In an example, a maximum size of the first area may equal to a size of the touch screen. A minimum size of the first area may be set to allow the user to input the finger with a sufficient area. The size of the first area is not limited in the present disclosure.

In an example, the first area may be arranged at a bottom left corner of the touch screen or a bottom right corner of the touch screen, or a top right corner of the touch screen, which is not limited in the present disclosure.

In an example, a shape of the first area may be circular, square, oval, rhombus or the like, which is not limited in the present disclosure.

In an example, there are one or more first areas, which is not limited in the present disclosure.

Each application corresponds to one first luminance. A correspondence between applications and first luminances is illustrated as Table 1. As illustrated in Table 1, different applications may correspond to the same first luminance, or different first luminances.

In addition, the first luminance corresponding to each application may be customized by the user. Alternatively, the first luminance corresponding to each application may be determined by the AP 110 based on an application characteristic. For example, when the currently running application is the fingerprint unlocking application whose application characteristic is unlocking, the first luminance of luminance 1. Also, for example, when the currently running application is the fingerprint recording application whose application characteristic is recording, the first luminance is luminance 2. In addition, for example, when the currently running application is the fingerprint payment application whose application characteristic is payment including a high-amount payment and a low-amount payment, the first luminance is luminance 4 when the characteristic is the high-mount payment while the first luminance is luminance 3 when the characteristic is the low-amount payment.

For example, as illustrated in Table 1, when the currently running application is the application 1, the first luminance corresponding to the application 1 is the luminance 1, and the terminal device controls the light-emitting units for the first area to emit the light with the luminance 1.

Therefore, the present disclosure may flexibly adjust the luminance of the light for capturing the fingerprint based on the currently running application, thereby improving the performance of the terminal device. In addition, when the fingerprint is captured, only the first area is controlled to emit the light, which may reduce power consumption of the terminal device.

In an example, each application corresponds to one security level. Each security level corresponds to one first luminance. When the security level of an application i is higher than the security level of an application j, the first luminance corresponding to the application i is higher than the first luminance corresponding to the application j.

In detail, a correspondence among applications, security levels and first luminances is illustrated as Table 2. As illustrated in Table 2, the security levels corresponding to different applications may be the same with each other, or may be different from each other, but the first luminances corresponding to different security levels are different.

Since the higher the luminance, the higher the sharpness of the fingerprint captured by the optical fingerprint sensor, when the security level of an application is high, it requires high sharpness of the fingerprint, vice versa. Therefore, in embodiments of the present disclosure, the security level relates to the first luminance to reasonably control the luminance of the first area, thereby further improving the performance of the terminal device.

Further, the security levels corresponding to the applications may be customized by the user. Alternatively, the security levels corresponding to the applications may be customized by the terminal device. Alternatively, the security levels corresponding to the applications may be determined by the terminal device based on the application characteristics. For example, when the currently running application is the fingerprint unlocking application whose application characteristic is unlocking, since the security level required by the unlocking is relatively low, the security level corresponding to the fingerprint unlocking application may be set as security level 1. Also, for example, when the currently running application is the fingerprint recording application whose application characteristic is recording, since a success rate of verifying the fingerprint depends on the sharpness of the fingerprint recorded by the fingerprint recording application, it thus requires a relatively high security level, and the security level corresponding to the fingerprint recording application may be set as security level 2. In addition, for example, when the currently running application is the fingerprint payment application whose application characteristic is payment including high-amount payment and low-amount payment, since related to pecuniary exchange, it thus requires a higher security level, the security level corresponding to the fingerprint payment application may be set as security level 4 when the application characteristic is the high-amount payment while the security level corresponding to the fingerprint payment application may be set as security level 3 when the application characteristic is the low-amount payment. The security level 1<the security level 2<the security level 3, and so on.

Further, the first luminances corresponding to the security levels may be customized by the user. Alternatively, the first luminances corresponding to the security levels may be customized by the terminal device.

For example, as illustrated in Table 2, when the currently running application is the application 1, the security level corresponding to the application 1 is the security level 1, and the first luminance corresponding to the security level 1 is the first luminance 1. The terminal device may control the light-emitting units for the first area to emit the light with the luminance 1.

In an example, when the currently running application is the fingerprint payment application, a currently displayed interface on the touch screen is a payment interface. The touch screen also includes a second area. The first area and the second area are mutually exclusive with each other. The method further includes controlling light-emitting units for the second area to emit light with a second luminance when controlling the light-emitting units for the first area to emit the light with the first luminance. The second luminance is lower than the first luminance.

If the second luminance is a display luminance set currently on the terminal device, during a fingerprint capturing process, the terminal device only controls the luminance of the first area to rise. Therefore it may not only capture the fingerprint with high sharpness by the optical fingerprint sensor, but also reduce the power consumption of the terminal device. Also, if the first luminance is the display luminance set currently on the terminal device, during the fingerprint capturing process, the terminal device controls the luminance of the second area to fall down. Therefore it may not only capture the fingerprint with high sharpness by the optical fingerprint sensor and reduce the power consumption of the terminal device, but also make the user to see clearly content displayed in the second area.

Further, the second area is remaining of the touch screen 120 except the first area, as illustrated in FIG. 2.

Further, the first area is configured to display prompt information for prompting the user to input the fingerprint. The prompt information may be illustrated in FIG. 2 as "fingerprint payment", or may be "input fingerprint" and the like, which is not limited in embodiments.

Further, the second area is configured to display information related to a current operation, which may be illustrated in FIG. 3 as "XXX platform, payment manner: xxxxxxx, order information: xxxxx, amount: xxxxx".

In an example, the currently running application is the fingerprint payment application, a currently displayed interface on the touch screen is a payment interface, and the touch screen further includes a second area. The first area and the second area are mutually exclusive with each other. The method further includes disabling light-emitting units for the second area when controlling the light-emitting units for the first area to emit the light with the first luminance.

Further, the method also includes the following.

The terminal device controls the light-emitting units for the second area and the light-emitting units for the first area to emit light with a third luminance after a fingerprint payment process completes. The third luminance is the display luminance set currently on the terminal device.

The fingerprint payment process (including the fingerprint capturing process and a fingerprint comparison process) takes a certain period of time. In order to reduce the power consumption of the terminal device, the terminal device may control the second area to not emit the light during the fingerprint payment process, and control the first area and the second area to emit the light with a normal luminance after the fingerprint payment process completes.

In an example, N is an integer greater than 1 and a detail implementation of controlling the light-emitting units for the first area to emit the light with the first luminance includes controlling light-emitting units for M subareas included in N subareas to emit the light with the first luminance, where M is a positive integer. A horizontal projection of the finger of the user is located in the M subareas.

Further, the method also includes the following.

The terminal device disables the light-emitting units for other subareas included in the N subareas than the M subareas when controlling the light-emitting units for the M subareas included in the N subareas to emit the light with the first luminance.

Alternatively, further, the method also includes the following.

The terminal device controls the light-emitting units for other subareas included in the N subareas than the M subareas to emit light with a fourth luminance, when controlling the light-emitting units for the M subareas included in the N subareas to emit the light with the first luminance. The fourth luminance is lower than the first luminance.

Further, sizes of the N subareas are the same. Alternatively, sizes of at least two of the N subareas are different from each other.

Further, shapes of the N subareas are the same. Alternatively, shapes of at least two of the N subareas are different from each other.

For example, FIG. 4 is a schematic diagram illustrating an interface provided in embodiments of the present disclosure. As illustrated in FIG. 4, the sizes of the N subareas included in the first area are the same and the shapes of the N subareas included in the first area are the same. The first area includes a subarea A, . . . , a subarea L. If the horizontal project of the finger of the user is within the subarea B, the subarea C, the subarea F and the subarea the currently running application only needs to control light-emitting units for the subarea B, the subarea C, the subarea F and the subarea G to emit the light with the first luminance to enable the optical fingerprint sensor to capture the fingerprint with high sharpness. For other subareas (remaining subareas included in the first area except the subarea B, the subarea C, the subarea F and the subarea G), the light-emitting units for these subareas may be disabled or the luminances of these subareas may be decreased, thereby reducing the power consumption of the terminal device with an acquirement of the fingerprint with the high sharpness.

Figure 6:
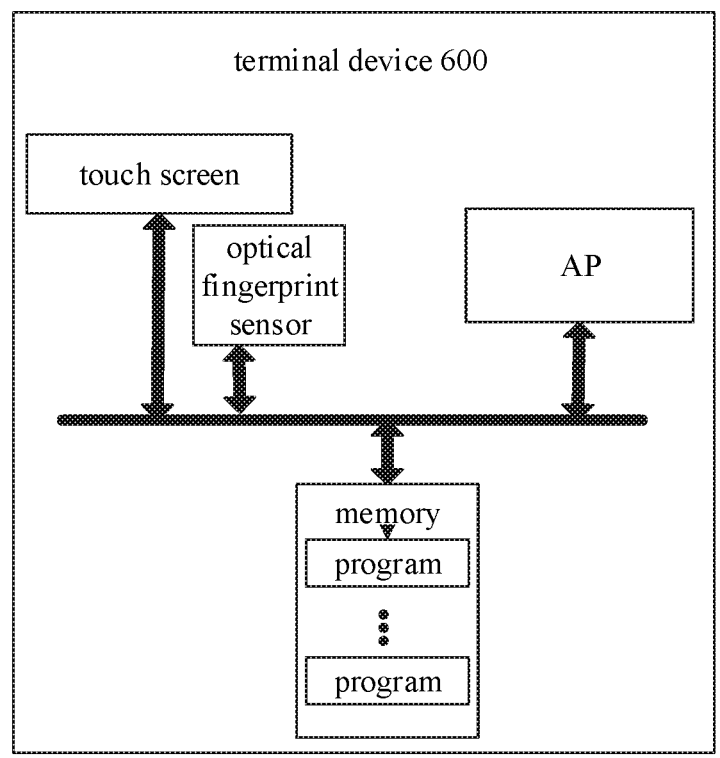
FIG. 6 is a block diagram illustrating another terminal device provided in embodiments of the present disclosure.

FIG. 6 is a schematic diagram illustrating a terminal device 600 provided in embodiments of the present disclosure. The terminal device 600 includes at least one processor (including an AP), an optical fingerprint sensor, a touch screen, at least one memory, and one or more programs. The touch screen includes a first area. The optical fingerprint sensor is arranged under the first area.

The one or more programs are stored in the memory and are configured to be executed by the AP. The one or more programs include instructions for executing the following.

A first luminance is determined based on a currently running application and light-emitting units for the first area are controlled to emit light with a first luminance. The light with the first luminance is configured to illuminate a finger of a user.

The fingerprint is captured when the light with the first luminance illuminates the first area.

In an example, each application corresponds to one security level. Each security level corresponds to one first luminance. When the security level of an application i is greater than the security level of an application j, the first luminance corresponding to the application i is greater than the first luminance corresponding to the application j.

In an example, when the currently running application is a fingerprint payment application, a currently displayed interface on the touch screen is a payment interface. The touch screen also includes a second area. The first area and the second area are mutually exclusive with each other. The one or more programs further include instructions for executing the following.

Light-emitting units for the second area are controlled to emit light with a second luminance when the light-emitting units for the first area are controlled to emit the light with the first luminance. The second luminance is lower than the first luminance.

In an example, when the currently running application is a fingerprint payment application, a currently displayed interface on the touch screen is a payment interface. The touch screen further includes a second area. The first area and the second area are mutually exclusive with each other. The one or more programs further include instructions for executing the following.

Light-emitting units of the second area are disabled when the light-emitting units for the first area are controlled to emit the light with the first luminance.

In an example, the first area includes N subareas, where N is an integer greater than 1. The one or more programs further include instructions for executing the following when the light-emitting units for the first area are controlled to emit the light with the first luminance. Light-emitting units for M subareas included in the N subarea are controlled to emit the light with the first luminance, where M is a positive integer. A horizontal projection of the finger of the user is located in the M subareas.

Therefore, in the embodiments of the present disclosure, the luminance of the light for capturing the fingerprint may be adjusted flexibly based on the currently running application, thereby improving the performance of the terminal device. In addition, when the fingerprint is captured, only the first area is controlled to emit the light to reduce the power consumption of the terminal device.

Figure 7:
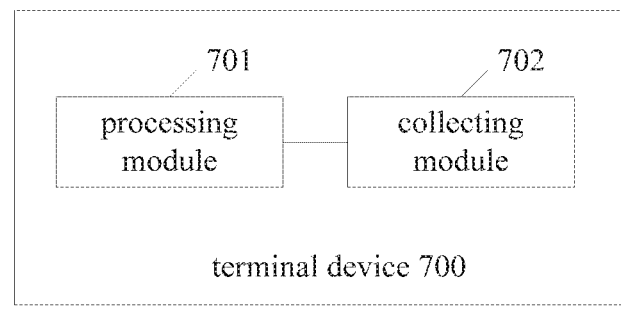
FIG. 7 is a block diagram illustrating still another terminal device provided in embodiments of the present disclosure.

FIG. 7 is a block diagram illustrating a device 700 for capturing a fingerprint provided in embodiments of the present disclosure. The device 700 for capturing a fingerprint may be applicable in a terminal device. The terminal device includes an AP, an optical fingerprint sensor and a touch screen. The touch screen includes a first area. The optical fingerprint sensor is arranged under the first area. The device 700 for capturing a fingerprint includes a processing module 701 and a capturing module 702.

The processing module 701 is configured to determine a first luminance based on a currently running application, and to control light-emitting units for the first area to emit light with a first luminance. The light with the first luminance is configured to illuminate a finger of a user.

The capturing module 702 is configured to capture the fingerprint when the light with the first luminance illuminates the first area.

In an example, each application corresponds to one security level. Each security level corresponds to one first luminance. When the security level of an application i is greater than the security level of an application j, the first luminance corresponding to the application i is greater than the first luminance corresponding to the application j.

In an example, when the currently running application is a fingerprint payment application, a currently displayed interface on the touch screen is a payment interface. The touch screen also includes a second area. The first area and the second area are mutually exclusive with each other. The processing module 701 is configured to control light-emitting units for the second area to emit light with a second luminance when the light-emitting units for the first area are controlled to emit the light with the first luminance. The second luminance is lower than the first luminance.

In an example, when the currently running application is a fingerprint payment application, a currently displayed interface on the touch screen is a payment interface. The touch screen also includes a second area. The first area and the second area are mutually exclusive with each other. The processing module 701 is configured to disable light-emitting units for the second area when the light-emitting units for the first area are controlled to emit the light with the first luminance.

In an example, the first area includes N subareas, where N is an integer greater than 1. The processing module 701 is further configured to control light-emitting units for M subareas included in the N subareas to emit the light with the first luminance, where M is a positive integer and a horizontal projection of the finger of the user is located in the M subareas.

It should be illustrated that, the above modules (i.e., the processing module 701 and the capturing module 702) are configured to execute corresponding actions of the above methods.

In embodiments, the device 700 for capturing a fingerprint is implemented as modules. The "module" referred herein may be a particular application-specific integrated circuit (ASIC), a processor configured to execute one or more software or firmware programs, a memory, an integrated logic circuit, and/or other components able to providing the above functions. Furthermore, the above processing module 701 and capturing module 702 may be implemented by the AP of the terminal device illustrated in FIG. 6.

Figure 8:
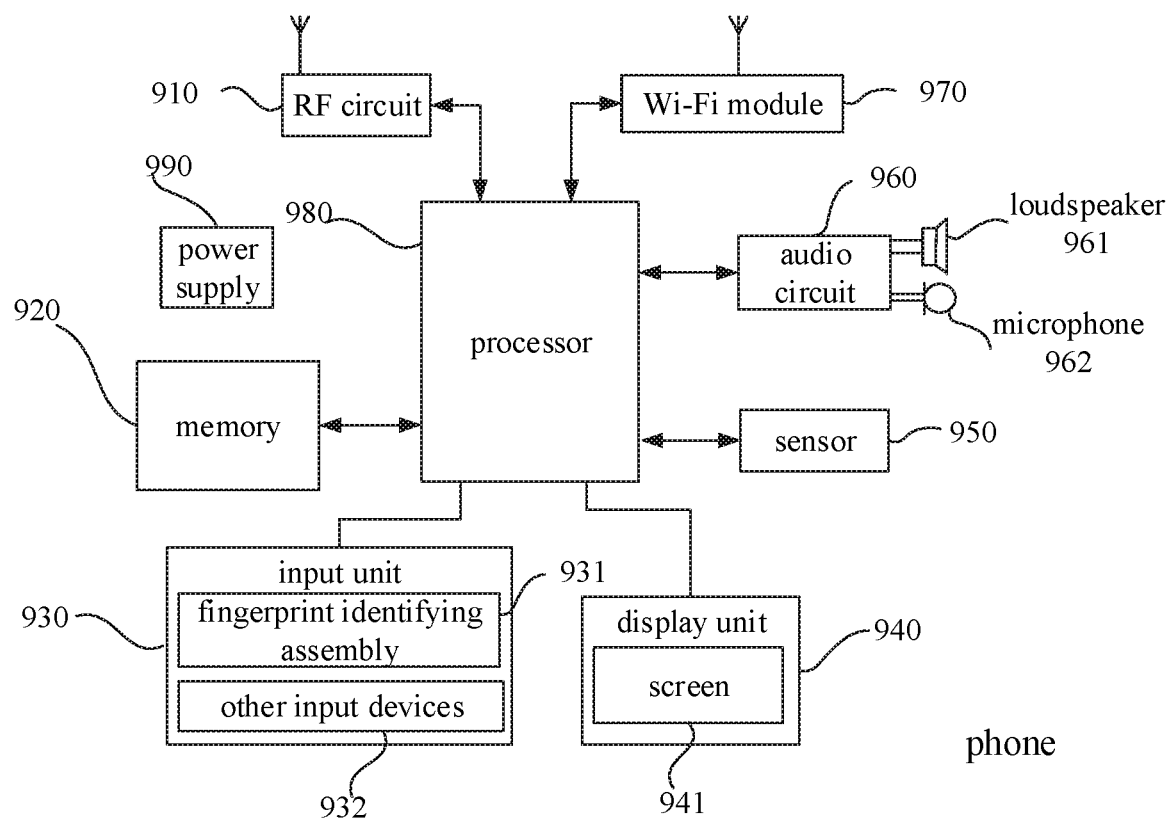
FIG. 8 is a block diagram illustrating yet another terminal device provided in embodiments of the present disclosure.

Embodiments of the present disclosure provide another terminal device, illustrated as FIG. 8. For simplification of illustration, portions related to embodiments of the present disclosure are merely illustrated. For those details not disclosed, method embodiments of the present disclosure may be referred to. The terminal device may include a phone, a tablet computer, a personal digital assistant (PDA), a point of sales (POS), an on-board computer, a wearable device or any other terminal device. The phone is taken as an example for illustrating.

FIG. 8 is a block diagram illustrating partial structures of a phone related to a terminal device provided in embodiments of the present disclosure. With reference to FIG. 8, the phone includes a radio frequency (RF) circuit 910, a memory 920, an input unit 930, a display unit 940, a sensor 950, an audio circuit 960, a wireless fidelity (Wi-Fi) module 970, a processor 980 and a power supply 990. It may be understood by those skilled in the art that, the structures illustrated in FIG. 8 do not limit the structures of the phone. The phone may include less or more components than those illustrated in FIG. 8 or combinations thereof, or have a different arrangement of components.

Each components of the phone will be described in detail in combination with FIG. 8.

The RF circuit 910 may be configured to receive or transmit messages. In general, the RF circuit 910 includes but is not limited to an antenna, at least one amplifier, a transceiver, a coupler, a low noise amplifier (LNA), a diplexer and the like. Furthermore, the RF circuit 910 may be further configured to communicate with other devices via wireless communication and network. The above wireless communication may adopt any one of communication standards or protocols, including but not being limited to global system of mobile communication (GSM), general packet radio service (GPRS), code division multiple access (CDMA), wideband code division multiple access (WCDMA), long term evolution (LTE), e-mail, short messaging service (SMS) and the like.

The memory 920 may be configured to store software programs or modules. The processor 980 is configured to execute various functional applications and data processes of the phone by running the software programs and modules stored in the memory 920. The memory 920 may mainly include a program storage region and a data storage region. The program storage region may store an operation system, at least one function required applications and the like. The data storage region may store data produced by using the phone (such as N frequencies corresponding to N light sources, an importance priority of an application i and so on) and the like. In addition, the memory 920 may include a high speed random access memory and may include a non-volatility memory, such as at least one disk memory, a flash memory, or other volatility solid state memory.

The input unit 930 may be configured to receive figures or character information inputted and to generate a key-signal input related to a user setup or function control of the phone. In detail, the input unit 930 may include a fingerprint sensor 931 and other input devices 932. The fingerprint sensor 931 may be configured to capture fingerprint data thereon. In addition the fingerprint sensor 931, the input unit 930 may further include the other input devices 932. In detail, the other input devices 932 may include but not limited to one or more of a touch screen, a physical keyboard, a functional key (such as a volume control key, a switch key and the like), a tracking boll, a mouse, an operation lever.

The display unit 940 may be configured to display information inputted by the user or information provided to the user or various menus of the phone. The display unit 940 may include a display screen 941. Alternatively, the display screen 941 may be configured as a liquid crystal display (LCD), an organic light-emitting diode (OLED) and the like. Although, the fingerprint sensor 931 and the display screen 941 are two separate components to realize an input function and an output function of the phone illustrated in FIG. 8, in certain embodiments, the fingerprint sensor 931 and the display screen 941 may be integrated to realize the input function and the output function of the phone.

The phone may further include at least one sensor 950, such as an optical sensor, a motion sensor and other sensors. In detail, the optical sensor may include a surrounding light sensor and a proximity sensor. The surrounding light sensor may adjust a luminance of the display screen 941 based on the luminance of surrounding lights. The proximity sensor may close the display screen 941 and/or backlight units when the phone moves near ears of the user. As the motion sensor, an acceleration sensor may be configured to measure acceleration values in various directions (generally in three axes), measure a value and a direction of gravity when the phone is static, and identify the phone gesture applications (such as horizontal and vertical screen switching, related games, magnetometer attitude calibration), identify, based on vibration, related functions (such as pedometer, percussion), and the like. For other configurable sensors such as gyroscope, barometer, humidity meter, thermometer, infrared sensors, they are not elaborated in embodiments of the present disclosure.

The audio circuit 960, a loudspeaker 961 and a microphone 962 may provide an audio interface between the user and the phone. The audio circuit 960 may transmit electrical signals converted from received audio data to the loudspeaker 961. The loudspeaker 961 converts the electrical signals to sound signals and outputs the sound signals. In another aspect, the microphone 962 may convert collected sound singles to electrical signals. The audio circuit 960 receives and converts the electrical signals to audio data and outputs the audio data to the processor 980 to be processed. The audio data processed by the processor 980 may be transmitted to for example another phone via the RF circuit 910 or may be stored in the memory 920 for subsequently processing.

Wi-Fi is a short distance wireless communication technology. The phone may help the user to receive or send an e-mail, search webpages, access stream medium via the Wi-Fi module 970. The Wi-Fi module 970 provides a wireless broadband Internet access. Although the Wi-Fi module 970 is illustrated in FIG. 8, it may be understood that, the Wi-Fi module 970 is not necessary for the phone, thus it may be omitted based on demands without changing the scope of the present disclosure.

The processor 980 is a control center of the phone, utilizing various interfaces and wires to connect various parts of the phone. By running or executing the software program and/or modules stored in the memory 920, and by invoking data stored in the memory 920, the various functions and data processing functions may be executed, thus the phone may be integrally monitored. Alternatively, the processor 980 may include one or more processing units. Alternatively, the processor 980 may be integrated with an application processor or a modem processor. The application processor mainly processes the operation system, a user interface and applications. The modem processor mainly processes wireless communication. It may be understood that, the above modem controller may be not integrated in the processor 980.

The phone may further include a power supply 990 (such as a battery) for providing powers to various parts of the phone. Alternatively, the power supply may be logically connected to processor 980 via a power management system, thereby managing a charging, discharging and power consumption via the power management system.

Although not illustrated, the phone may further include a camera, a Bluetooth module and the like, which are not elaborated herein.

In embodiments illustrated as FIG. 5, the flow chart may be executed based on the structure of the phone illustrated as FIG. 8.

In embodiments illustrated as FIG. 7, functions of modules may be realized based on the structure of the phone illustrated as FIG. 8.

Embodiments of the present disclosure further provide a computer storage medium. In the computer storage medium, computer storages for exchanging electrical data are stored. The computer programs are configured to cause a computer to execute parts of or all of the method for capturing a fingerprint described in any one of embodiments of the present disclosure.

Embodiments of the present disclosure further provide a computer program product. The computer program product includes a non-transitory computer readable storage medium storing computer programs. The computer programs are executable to cause a computer to execute parts of or all of the method for capturing a fingerprint described in any one of embodiments of the present disclosure. The computer program product may be a software installation package.

It may be illustrated that, for foregoing described method embodiments, for the sake of brief description, all of the method embodiments are described as a series of operation combinations. However, those skilled in the art should understand that the present disclosure is not limited to a described sequence of operations, because some blocks may be performed in other sequences or concurrently according to the present disclosure. Secondly, those skilled in the art should also know that embodiments described in the specification belong to preferred embodiments, and actions and modules involved are not necessarily required by the present disclosure.

In above embodiments, different emphasis is made to descriptions of embodiments. For those not described in detail in embodiments, reference may be made to related descriptions in other embodiments.

In the embodiments provided in the present application, it should be understood that the disclosed device may be implemented in other manners. For example, the device embodiments described above are merely exemplary. For example, the unit division is merely a logical function division and may be other division in actual implementation. For example, a plurality of units or components may be combined or may be integrated into another system, or some features may be ignored or not executed. In addition, illustrated or discussed mutually coupling or directly coupling or communicational connection may be indirectly coupling or communicational connection through interfaces, devices or units, and may be electrically coupling or in other forms.

Units described as separate components may be or may not be physically separated. Components displayed as units may be or may not be physical units, that is, they may be located in a same position or may also be distributed to multiple network units. Some or all of the units may be selected based on actual needs to achieve the objectives of solutions in embodiments of the present disclosure.

In addition, each functional unit in each embodiment of the present disclosure may be integrated into one processing unit, or each unit may exist alone physically, or two or more units may be integrated in one unit. The above-mentioned integrated units may be implemented in a form of hardware or in a form of software functional unit.

The integrated unit, if implemented in the form of a software functional unit and sold or used as an independent product, may be stored in a computer readable memory. Based on this understanding, the technical solution of the present disclosure essentially, or the part contributing to the prior art, or all or part of the technical solution may be embodied in the form of software product stored in the memory, including several instructions for enabling a computer device (which may be a personal computer, a server, a network device or the like) to perform all or part of blocks of the method provided in embodiments of the present disclosure. The foregoing memory includes various media capable of storing program codes, such as a USB flash disk, a read-only memory (ROM), a random access memory (RAM), a removable hard disk, a magnetic disk, an optical disk or the like.

Those skilled in the art should understand that all or part of the blocks in the methods in embodiments may be implemented by a program instructing relevant hardware. The program may be stored in a computer readable memory. The computer readable memory may include a flash drive, a read-only memory (ROM), a random access memory (RAM), a magnetic disk, an optical disk or the like.

Embodiments of the present disclosure are described in detail above. Specific examples are used herein to describe the principles and implementation manners of the present disclosure. The description of the above embodiments is merely used to help understand the method and key idea of the present disclosure. Meanwhile, those skilled in the art may make modifications to the detailed description and application scopes according to ideas of the present disclosure. In view of the above descriptions, the specification should not be construed as limiting the present disclosure.

What is claimed is:

1. A terminal device comprising an application processor, an optical fingerprint sensor and a touch screen, the touch screen comprising a first area, and the optical fingerprint sensor being arranged under the first area, wherein
   the application processor is configured to detect a fingerprint capturing instruction sent by a currently running application being one of a plurality of applications, to determine a first luminance based on the currently running application when the fingerprint capturing instruction sent by the currently running application is detected, to control light-emitting units for the first area to emit light with the first luminance, and to control the first area to display a prompting message of inputting the fingerprint; and
   the optical fingerprint sensor is configured to capture the fingerprint when the light with the first luminance illuminates the first area,
   each application of the plurality of applications is assigned to one security level, and each security level is assigned to one specific luminance; when the security level of an application i is greater than the security level of an application j, the first luminance corresponding to the application i is greater than the first luminance corresponding to the application j,
   the higher the luminance, the higher the sharpness of a fingerprint captured by the optical fingerprint sensor.

2. The terminal device according to claim 1, wherein the currently running application is a fingerprint payment application, a currently displayed interface on the touch screen is a payment interface, the touch screen further comprises a second area, the first area and the second area are mutually exclusive, and the application processor is further configured to control light-emitting units for the second area to emit light with a second luminance when controlling the light-emitting units for the first area to emit the light with the first luminance, wherein the second luminance is less than the first luminance.

3. The terminal device according to claim 1, wherein the currently running application is a fingerprint payment application, a currently displayed interface on the touch screen is a payment interface, the touch screen further comprises a second area, the first area and the second area are mutually exclusive, and the application processor is further configured to disable light-emitting units for the second area when controlling the light-emitting units for the first area to emit the light with the first luminance.

4. The terminal device according to claim 3, wherein the application processor is further configured to control the light-emitting units for the second area and the light-emitting units for the first area to emit light with a third luminance when the fingerprint payment application finishes payment.

5. The terminal device according to claim 4, wherein the application processor is further configured to control the light-emitting units for the second area and the light-emitting units for the first area to emit light with a third luminance when the fingerprint payment application finishes payment.

6. The terminal device according to claim 1, wherein the first area comprises N subareas, N is an integer greater than 1, and the application processor is further configured to:

control light-emitting units for M subareas comprised in the N subareas to emit the light with the first luminance;

wherein a horizontal projection of the finger is located within the M subareas, and M is a positive integer.

7. The terminal device according to claim 6, wherein the application processor is further configured to disable light-emitting units for other subareas comprised in the N subareas than the M subareas when controlling the light-emitting units for the M subareas comprised in the N subareas to emit the light with the first luminance.

8. The terminal device according to claim 6, wherein the application processor is further configured to control light-emitting units for other subareas comprised in the N subareas than the M subareas to emit light with a fourth luminance when controlling the light-emitting units for the M subareas comprised in the N subareas to emit the light with the first luminance, wherein the fourth luminance is lower than the first luminance.

9. A method for capturing a fingerprint, applicable to a terminal device comprising an application processor, an optical fingerprint sensor and a touch screen, the touch screen comprising a first area, and the optical fingerprint sensor being arranged under the first area, wherein the method comprises:

detecting a fingerprint capturing instruction sent by a currently running application being one of a plurality of applications;

determining a first luminance based on a currently running application when the fingerprint capturing instruction sent by the currently running application is detected;

controlling light-emitting units for the first area to emit light with the first luminance;

controlling the first area to display a prompting message of inputting the fingerprint; and capturing the fingerprint when the light with the first luminance illuminates the first area, wherein each application of the plurality of applications is assigned to one security level, and each security level is assigned to one specific luminance; when the security level of an application i is greater than the security level of an application j, the first luminance corresponding to the application i is greater than the first luminance corresponding to the application j, the higher the luminance, the higher the sharpness of a fingerprint captured by the optical fingerprint sensor.

10. The method according to claim 9, wherein the currently running application is a fingerprint payment application, a currently displayed interface on the touch screen is a payment interface, the touch screen further comprises a second area, the first area and the second area are mutually exclusive, the method further comprises:

controlling light-emitting units for the second area to emit light with a second luminance when controlling the light-emitting units for the first area to emit the light with the first luminance, wherein the second luminance is less than the first luminance.

11. The method according to claim 10, further comprising:

controlling the light-emitting units for the second area and the light-emitting units for the first area to emit light with a third luminance when the fingerprint payment application finishes payment.

12. The method according to claim 9, wherein the currently running application is a fingerprint payment application, a currently displayed interface on the touch screen is a payment interface, the touch screen further comprises a second area, the first area and the second area are mutually exclusive, the method further comprises:

disabling light-emitting units for the second area when controlling the light-emitting units for the first area to emit the light with the first luminance.

13. The method according to claim 12, further comprising:

controlling the light-emitting units for the second area and the light-emitting units for the first area to emit light with a third luminance when the fingerprint payment application finishes payment.

14. The method according to claim 9, wherein the first area comprises N subareas, N is an integer greater than 1, controlling the light-emitting units for the first area to emit the light with the first luminance comprises:

controlling light-emitting units for M subareas comprised in the N subareas to emit the light with the first luminance, wherein a horizontal projection of the finger is located within the M subareas, and M is a positive integer.

15. The method according to claim 14, further comprising:

disabling light-emitting units for other subareas comprised in the N subareas than the M subareas when controlling the light-emitting units for the M subareas comprised in the N subareas to emit the light with the first luminance.

16. The method according to claim 14, further comprising:

controlling light-emitting units for other subareas comprised in the N subareas than the M subareas to emit light with a fourth luminance when controlling the light-emitting units for the M subareas comprised in the N subareas to emit the light with the first luminance, wherein the fourth luminance is lower than the first luminance.

17. A non-transitory computer readable storage medium, storing computer programs for exchanging electrical data, wherein the computer programs cause a terminal device to execute a method, in which the terminal device comprises an application processor, an optical fingerprint sensor and a touch screen, the touch screen comprises a first area, the optical fingerprint sensor is arranged under the first area, and the method comprises:

detecting a fingerprint capturing instruction sent by a currently running application being one of a plurality of applications;
   determining a first luminance based on a currently running application when the fingerprint capturing instruction sent by the currently running application is detected;
   controlling light-emitting units for the first area to emit light with the first luminance;
   controlling the first area to display a prompting message of inputting the fingerprint; and
   capturing a fingerprint when the light with the first luminance illuminates the first area, wherein each application of the plurality of applications is assigned to one security level, and each security level is assigned to one specific luminance; when the security level of an application i is greater than the security level of an application j, the first luminance corresponding to the application i is greater than the first luminance corresponding to the application j, the higher the luminance, the higher the sharpness of a fingerprint captured by the optical fingerprint sensor.

* * * * *